(12) United States Patent
Young et al.

(10) Patent No.: US 7,382,799 B1
(45) Date of Patent: Jun. 3, 2008

(54) ON-DEMAND BROADCAST PROTOCOL

(75) Inventors: C. David Young, Plano, TX (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 743 days.

(21) Appl. No.: 10/847,786

(22) Filed: May 18, 2004

(51) Int. Cl.
*H04L 12/43* (2006.01)

(52) U.S. Cl. ............... 370/458; 370/230; 370/280; 370/376; 370/468; 370/437

(58) Field of Classification Search ........... 370/229, 370/230, 280, 294, 352, 376, 468, 431, 437, 370/458, 459
See application file for complete search history.

(56) References Cited

U.S. PATENT DOCUMENTS

| | | | | |
|---|---|---|---|---|
| 4,504,946 | A | 3/1985 | Raychaudhuri | 370/322 |
| 4,763,322 | A | 8/1988 | Eizenhofer | 370/337 |
| 5,012,469 | A | 4/1991 | Sardana | 370/322 |
| 5,117,422 | A | 5/1992 | Hauptschein et al. | 370/255 |
| 5,245,609 | A | 9/1993 | Ofek et al. | 370/348 |
| 5,295,140 | A | 3/1994 | Crisler et al. | 370/443 |
| 5,396,496 | A | 3/1995 | Ito et al. | 370/314 |
| 5,420,858 | A | 5/1995 | Marshall et al. | 370/352 |
| 5,448,698 | A | 9/1995 | Wilkes | 395/200.01 |
| 5,450,394 | A | 9/1995 | Gruber et al. | 370/17 |
| 5,457,681 | A | 10/1995 | Gaddis et al. | 370/402 |
| 5,502,722 | A | 3/1996 | Fulghum | 370/69 |
| 5,506,848 | A | 4/1996 | Drakopoulos et al. | 370/336 |
| 5,568,477 | A | 10/1996 | Galand et al. | 370/60 |
| 5,581,548 | A | 12/1996 | Ugland et al. | 370/330 |
| 5,594,720 | A | 1/1997 | Papadopoulos et al. | 370/330 |
| 5,598,417 | A | 1/1997 | Crisler et al. | 370/348 |
| 5,613,198 | A | 3/1997 | Ahmadi et al. | 370/337 |
| 5,625,629 | A | 4/1997 | Wenk | 370/330 |
| 5,644,576 | A | 7/1997 | Bauchot et al. | 370/437 |
| 5,652,751 | A | 7/1997 | Sharony | 340/2.4 |
| 5,696,903 | A | 12/1997 | Mahany | 709/228 |
| 5,719,868 | A | 2/1998 | Young | 370/436 |
| 5,742,593 | A | 4/1998 | Sharony et al. | 370/330 |

(Continued)

OTHER PUBLICATIONS

U.S. Appl. No. 09/422,498, "Method and Apparatus for Managing Communication Resources Using Dynamic and Static Assignment of Communication Slots," filed Oct. 21, 1999, C. David Young.

(Continued)

*Primary Examiner*—Firmin Backer
*Assistant Examiner*—Nguyen Ngo
(74) *Attorney, Agent, or Firm*—Nathan O. Jensen; Kyle Eppele

(57) ABSTRACT

A method of communicating over a network of nodes using a plurality of time slots is disclosed. According to the method, at least one of the plurality of time slots are assigned to a first node. The first node communicates, to neighboring nodes within one hop of the first node, which time slots assigned to the first node are scheduled to be used by the first node. Each neighboring node determines whether it has a need to use more time slots than it has been assigned. Each neighboring node communicates its respective need to the first node. At least one of the neighboring nodes is permitted to use one of the unscheduled time slots.

16 Claims, 7 Drawing Sheets

U.S. PATENT DOCUMENTS

| | | | | |
|---|---|---|---|---|
| 5,748,362 | A | | 5/1998 | Delacourt et al. .......... 359/326 |
| 5,920,703 | A | | 7/1999 | Campbell et al. ........... 709/236 |
| 5,949,760 | A | * | 9/1999 | Stevens et al. ............. 370/254 |
| 5,953,344 | A | | 9/1999 | Dail et al. ................... 370/337 |
| 5,983,259 | A | | 11/1999 | Campbell et al. ........... 709/200 |
| 6,014,089 | A | | 1/2000 | Tracy et al. ........... 340/870.02 |
| 6,018,528 | A | | 1/2000 | Gitlin et al. ................. 370/436 |
| 6,031,827 | A | | 2/2000 | Rikkinen et al. ........... 370/330 |
| 6,084,888 | A | | 7/2000 | Watanabe et al. ........... 370/473 |
| 6,084,889 | A | | 7/2000 | Murakami ................... 370/474 |
| 6,088,659 | A | | 7/2000 | Kelley et al. .................. 702/62 |
| 6,094,425 | A | * | 7/2000 | Auger et al. ................. 370/330 |
| 6,094,429 | A | | 7/2000 | Blanchette et al. .......... 370/337 |
| 6,140,184 | A | | 10/2000 | Dupuy ........................ 370/337 |
| 6,151,319 | A | | 11/2000 | Dommety et al. ..... 370/395.52 |
| 6,157,656 | A | | 12/2000 | Lindgren et al. ............ 370/458 |
| 6,252,868 | B1 | | 6/2001 | Diachina et al. ............. 370/347 |
| 6,256,304 | B1 | | 7/2001 | Vayrynen ..................... 370/350 |
| 6,256,477 | B1 | | 7/2001 | Eidson et al. .............. 455/63.3 |
| 6,275,506 | B1 | | 8/2001 | Fazel et al. .................. 370/459 |
| 6,304,559 | B1 | | 10/2001 | Jacklin et al. ............... 370/310 |
| 6,310,867 | B1 | | 10/2001 | Tat et al. ..................... 370/254 |
| 6,314,084 | B1 | | 11/2001 | Kahale et al. ............... 370/230 |
| 6,317,436 | B1 | | 11/2001 | Young et al. ................ 370/443 |
| 6,324,184 | B1 | | 11/2001 | Hou et al. .................. 340/7.43 |
| 6,331,973 | B1 | | 12/2001 | Young et al. ................ 370/337 |
| 6,353,598 | B1 | | 3/2002 | Baden et al. ................ 370/280 |
| 6,353,605 | B1 | | 3/2002 | Rautanen et al. ............ 370/337 |
| 6,369,719 | B1 | | 4/2002 | Tracy et al. ........... 340/870.02 |
| 6,384,739 | B1 | | 5/2002 | Roberts, Jr. et al. ........ 340/905 |
| 6,389,273 | B1 | | 5/2002 | Brandenburg ............... 455/296 |
| 6,414,955 | B1 | | 7/2002 | Clare et al. .................. 370/390 |
| 6,442,157 | B1 | | 8/2002 | Carter et al. ................. 370/347 |
| 6,466,793 | B1 | | 10/2002 | Wallstedt et al. ............ 455/450 |
| 6,487,186 | B1 | | 11/2002 | Young et al. ................ 370/336 |
| 6,498,667 | B1 | | 12/2002 | Masucci et al. ............... 398/98 |
| 6,504,829 | B1 | | 1/2003 | Young et al. ................ 370/337 |
| 6,529,443 | B2 | | 3/2003 | Downey et al. ............... 367/76 |
| 6,553,424 | B1 | | 4/2003 | Kranz et al. ................. 709/234 |
| 6,556,899 | B1 | | 4/2003 | Harvey et al. ................. 701/29 |
| 6,574,206 | B2 | | 6/2003 | Young ......................... 370/337 |
| 6,600,754 | B1 | | 7/2003 | Young et al. ................ 370/459 |
| 6,628,636 | B1 | | 9/2003 | Young ......................... 370/337 |
| 6,631,124 | B1 | | 10/2003 | Koorapaty et al. .......... 370/337 |
| 6,711,177 | B1 | | 3/2004 | Young et al. ................ 370/468 |
| 6,788,702 | B1 | * | 9/2004 | Garcia-Luna-Aceves et al. ........................... 370/458 |
| 7,082,111 | B2 | * | 7/2006 | Amouris ...................... 370/321 |
| 2002/0001294 | A1 | | 1/2002 | Amouris ...................... 370/337 |
| 2002/0046381 | A1 | | 4/2002 | Morris et al. ................ 714/752 |
| 2004/0028018 | A1 | * | 2/2004 | Cain ............................ 370/338 |
| 2004/0100929 | A1 | * | 5/2004 | Garcia-Luna-Aceves .... 370/338 |

OTHER PUBLICATIONS

U.S. Appl. No. 09/649,802, "Maintaining an Adaptive Broadcast Channel Using Both Transmitter Directed and Receiver Directed Broadcast," filed Aug. 29, 2000, C. David Young.

U.S. Appl. No. 09/649,665, "Data Communication Techniques for Real Time Data Transmission," Aug. 29, 2000, T. Golubiewski et al.

I. Chlamtac and A. Farago, "An Optimal Channel Access Protocol with Multiple Reception Capacity," Dept. of Telecommunications & Telematics, Technical University of Budapest, Budapest, Hungary. Publication date unknown; believed to be 1993.

U.S. Appl. No. 09/649,666, "Full Duplex Communication Slot Assignment," filed Aug. 29, 2000, C. David Young.

U.S. Appl. No. 10/689,448, "Heuristics for Combining Inter-Channel and Intra-Channel Communications in a Wireless Environment," filed Oct. 20, 2003, C. David Young et al.

Young, "USAP: A Unifying Dynamic Distributed Multichannel TDMA Slot Assignment Protocol," Proc. IEEE MILCOM 1996, vol. 1, Oct. 1996.

L. Pond and V. Li, "Bridging the Gap Interoperability, Survivability, Security," 1989 IEEE MILCOM, Conference Record, vol. 1 of 3.

Bittle, Caples, Young, "Soldier Phone: An Innovative Approach to Wireless Multimedia Communications," 1998 IEEE MILCOM, vol. 3.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1 Ju et al. "An Optimal Topology-Transport Scheduling Method in Multihop Packet Radio Networks." IEEE/ACM Transactions on Networking, Jun. 1998. pp. 298-306.

Chakraborty et al. "Generic Algorithm for Broadcast Scheduling in Packet Radio Networks," Evolutionary Computation Proceedings, 1998. IEEE World Congress on Computational Intelligence. May 4-9, 1998. pp. 183-188.

Pond et al. "A Distributed Time-Slot Assignment Protocol for Mobile Multi-Hop Broadcast Packet Radio Networks," IEEE MILCOM, 1989. Oct. 15-18, 1989. pp. 70-74.

Arikan, E. "Some Complexity Results about Packet Radio Networks," IEEE Transactions on Information Theory, v.IT-30, No. 4, Jul. 1984, pp. 681-685.

Chou et al. "Slot Allocation Strategies for TDMA Protocols in Multihop Packet Radio Network." Eleventh Annual Joint Conference of the IEEE Computer and Communications Societies. May 4-8, 1992. pp. 710-716.

Oono et al. "Dynamic Slot Allocation Technology for Mobile Multi-Media TDMA Systems Using Distributed Control Scheme," IEEE. Oct. 12-16, 1997. pp. 74-78.

U.S. Appl. No. 09/650,332, "Scheduling Techniques for Receiver Directed Broadcast Applications," filed Aug. 29, 2000, C. David Young.

U.S. Appl. No. 09/562,549, "Efficient Grouping of Control and User Data," filed May 2, 2000, J.A. Stevens et al. U.S. Appl. No. 09/303,802, "Clique Activation Multiple Access," filed Apr. 30, 1999, C. D. Young et al.

\* cited by examiner

ON-DEMAND BROADCAST PROTOCOL

FIELD OF THE INVENTION

The invention relates to communications, and more particularly, to a system and method for communicating over a wireless network.

BACKGROUND OF THE INVENTION

Wireless communications networks have found great utility in many commercial and military applications. However, some types of wireless networks become less efficient in transmitting information when a large number of nodes are attempting to communicate thereon.

Previous efforts to increase the efficiency of a wireless network have included the following, all of which are assigned to the same entity as the present application and which are incorporated by reference herein in their entirety:

U.S. Pat. No. 5,949,760, entitled "Simultaneous Channel Access Transmission Method and a Multi-Hop Communications Radio Network";

U.S. Pat. No. 5,719,868, titled "Dynamic Distributed, Multi-Channel Time Division Multiple Access Slot Assignment Method for a Network of Nodes";

U.S. Pat. No. 6,487,186, titled "A Method and Apparatus for Managing Communication Resources Using Bootstrap Slots";

U.S. Pat. No. 6,504,829, titled "A Method and Apparatus for Managing Communication Resources Using Channelized Neighborhoods";

U.S. Pat. No. 6,628,636, titled "A Method and Apparatus for Managing Communication Resources Using Neighbor Segregation";

U.S. Pat. No. 6,317,436, titled "A Method and Apparatus for Managing Communication Resources Using an Adaptive Broadcast Cycle (ABC)";

U.S. Pat. No. 6,331,973, titled "Unifying Slot Assignment Protocol Multiple Access System";

U.S. Pat. No. 6,574,206, titled "A Method and Apparatus for Managing Communication Resources Using Speculation Slots";

U.S. Pat. No. 6,600,754, titled "A Method and Apparatus for Managing Communication Resources Using Standby Slots";

U.S. Pat. No. 6,574,199, titled "Unifying Slot Assignment Protocol Logical Neighborhooding"; and U.S. patent application Ser. No. 10/689,448, filed Oct. 20, 2003, titled "Heuristics for Combining Inter-Channel and Intra-Channel Communications in a Wireless Communications Environment."

One challenge in efficiently managing networks with large numbers of nodes is maximizing the use of all communication slots. Typically each node in a network is assigned specific time slots in which to transmit messages or other information. A time slot may be assigned to a node either on a one-time basis, or the node may be assigned a time slot each time the time slot occurs in a repeating frame or time cycle. In either case, it is possible that a node has no messages or information to transmit during the time slot assigned to it, and the time slot would be wasted if not assigned to another node in the network. In addition, there may be some time slots that are not assigned or allocated to any node in the network.

One possible method of allocating unused time slots is to have slots report unused time slots to a central network controlling authority. However, such a central authority may not be immediately accessible to all nodes in a network, and by the time the central authority is advised of the existence of an unused slot, there may not be enough time to assign the time slot to a node that needs to use the slot.

Another challenge is allocating or re-assigning time slots in a network in which there are inherent constraints in the communication protocol of the network. For example, if the network is using principles of the Unifying Slot Assignment Protocol, certain nodes may not be able to have time slots re-assigned to them. This is because one of the USAP rules is that nodes less than three hops apart are not permitted to simultaneously use a time slot. Allocating or re-assigning a time slot to a node less than three hops from another node already using the time slot would violate this USAP rule and would cause conflicting transmissions to be sent across the network.

It is therefore an object of the invention to provide a method of allocating or re-assigning unused time slots.

It is another object of the invention to provide a method of re-assigning unused time slots that is consistent with other communications protocols, such as USAP.

It is still another object of the invention to provide a method of allocating or re-assigning unused time slots that does not depend on a central network authority to decide which nodes are to be awarded the re-assigned slots.

A feature of the invention is the sharing of information between nearby nodes to determine which of the nearby nodes is permitted to use an otherwise unused time slot.

An advantage of the invention is a de-centralized decision structure that efficiently and quickly re-assigns or re-allocates unused or unassigned time slots.

SUMMARY OF THE INVENTION

The invention provides a method of communicating over a network of nodes using a plurality of time slots, in which nodes are permitted to simultaneously use a time slot only when the nodes are at least three hops apart. According to the method, at least one of the plurality of time slots are assigned to a first node. The first node communicates, to neighboring nodes within one hop of the first node, which time slots assigned to the first node are scheduled to be used by the first node. Each neighboring node determines whether it has a need to use more time slots than it has been assigned. Each neighboring node communicates its respective need to the first node. At least one of the neighboring nodes is permitted to use a time slot assigned to the first node and not scheduled to be used by the first node.

The invention also provides a method of managing communication resources in a network of nodes, where a first node has a communication slot allocated thereto. According to the method, the first node communicates, to a neighboring node within one hop of the first node, whether the first node intends to use the communication slot. The neighboring node indicates, to nodes within one hop of the neighboring node, whether the neighboring node needs to use more communication slots than have been allocated to the neighboring node. The first node permits the neighboring node to use the communication slot when the first node is not scheduled to use the communication slot.

The invention further provides a method of managing message transmission in a communications network having a plurality of nodes, where the nodes communicate using a plurality of time slots. According to the method, nodes in the network are identified as needy nodes when the nodes have insufficient slots to timely communicate information through the network. Each of the needy nodes indicates a need to use slots unallocated to nodes within two hops of said each of the needy nodes. At least one of the needy nodes are permitted to contend for the unallocated slots.

DETAILED DESCRIPTION OF THE DRAWINGS

The invention can be understood best by first discussing multi-channel networks and the techniques of Unifying Slot Assignment Protocol (USAP). While the invention is not required to be used only with multi-channel networks or with all aspects of USAP, the following discussion provides helpful background for understanding of the invention.

Figure 1:
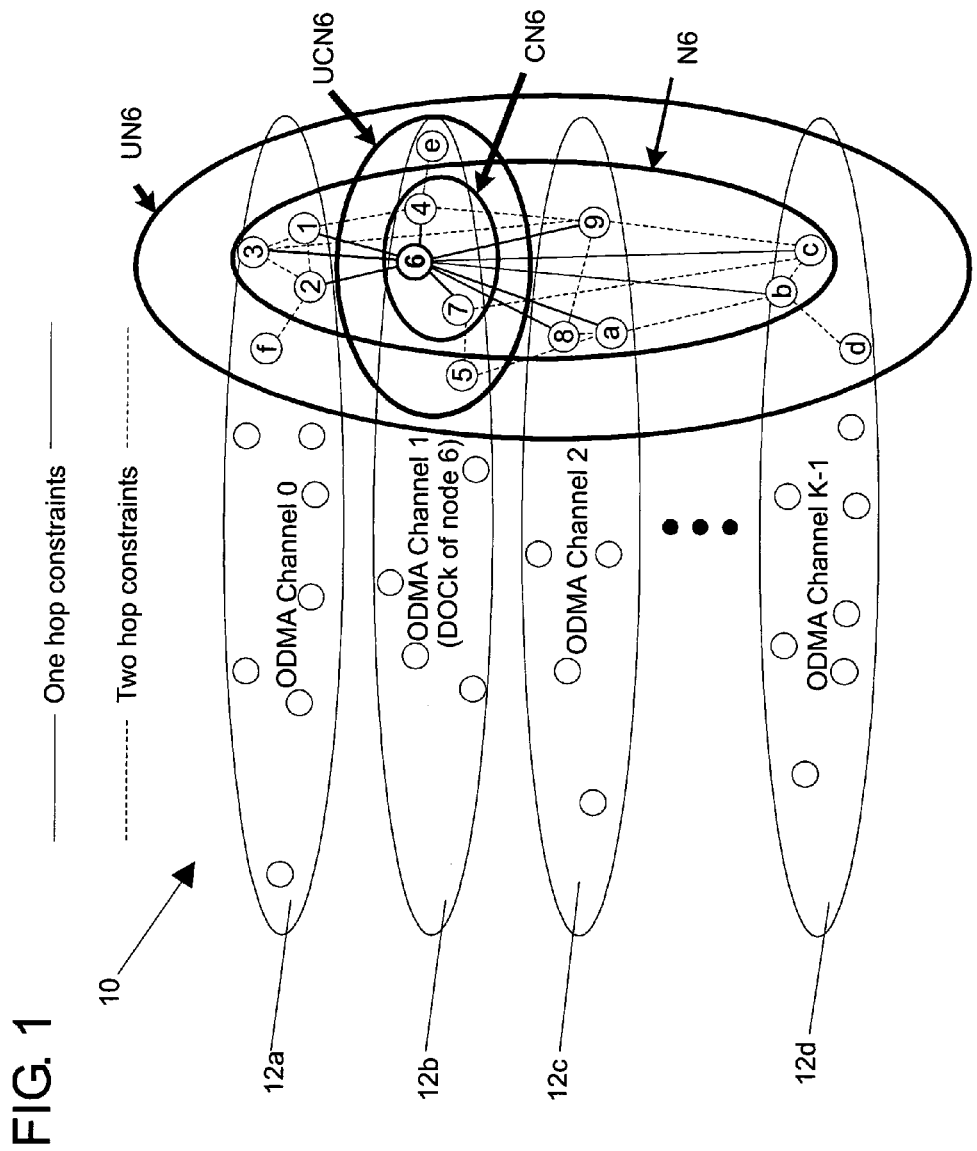
FIG. 1 is a schematic diagram of a communications network.

FIG. 1 depicts a plurality of nodes arranged in a communication network indicated generally by reference number 10. The nodes in network 10 are shown as being arranged in or assigned to one of a plurality of ODMA channels 12a, 12b, 12c, 12d. An ODMA Channel is what is managed to achieve simultaneous transmissions among neighboring nodes in the same Time Domain Multiple Access (TDMA) slot. Each node chooses a Default ODMA Channel k (DOCk) to facilitate communications with other nodes which have chosen the same DOCk. Each node i has a neighborhood Ni, which is the set of 1-hop neighbors of node i on all ODMA channels. Ni is unique to node i and is able to span the ODMA channels because the Ni bootstraps are monitored by all of its neighbors regardless of their DOCk. For example, the neighborhood of node 6 is identified as N6 and includes nodes 1, 2, 3, 4, 7, 8, 9, a, b, and c.

Each node i also has a USAP Neighborhood UNi, which is defined as the unique set of neighbors of node i and the neighbors of these neighbors (all nodes within 2 hops of a node i) on all ODMA channels. The subset of UNi that is 2 hops away on other DOCks is visible to i only in terms of USAP constraints, not node IDs. UNi is unique to node i and is able to span the ODMA channels because the bootstraps are monitored by all of its neighbors regardless of their DOCk. For example, the USAP neighborhood of node 6 is identified as UN6 and includes nodes 1, 2, 3, 4, 5, 7, 8, 9, a, b, c, d, e, and f.

Each node i also has a Channel Neighborhood CNi, which is defined as the set of 1-hop neighbors of node i sharing the same DOCk as i. In other words, a CNi is the subset of UNi that are direct neighbors of node i sharing the same DOCk as i. By sharing the same DOCk, node i can transmit to members of CNi using its rotating broadcast slots. The Channel neighborhood of node 6 is identified as CN6 and includes nodes 4 and 7.

Each node i further has a USAP Channel Neighborhood UCNi, which is defined as the set of neighbors of node i and the neighbors of these neighbors (all nodes within 2 hops of a node i) sharing the same DOCk as node i. All nodes within the UCNi are visible to node i both in terms of the USAP constraints from bootstrap packets and node IDs from monitor packets. The USAP channel neighborhood of node 6 is identified as UCN6 and includes nodes 4, 5, 7, and e.

Figure 2:
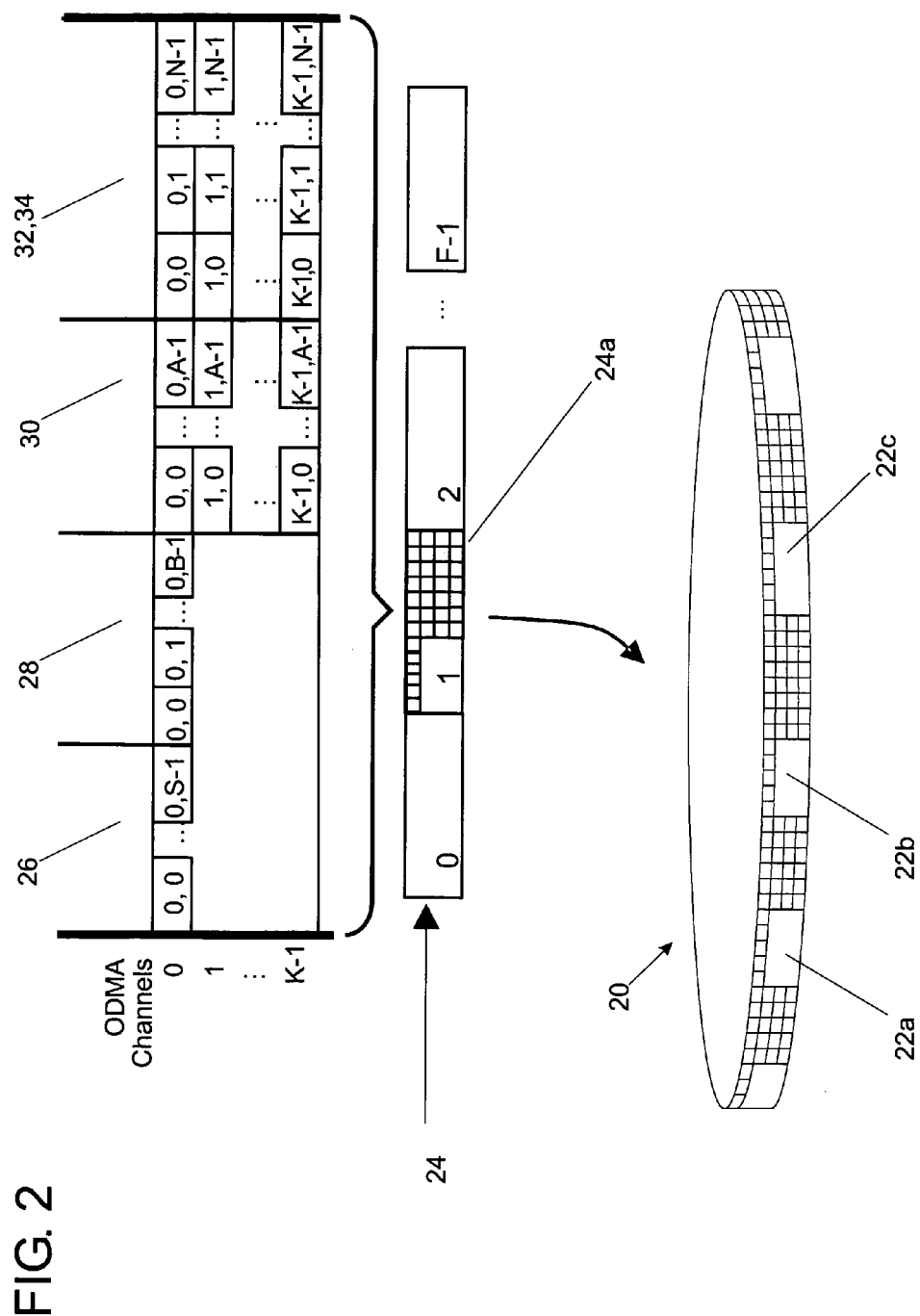
FIG. 2 is a schematic diagram of a multi-channel broadcast cycle.

FIG. 2 depicts an ODMA cycle 20 comprising a series of consecutively occurring and cyclically repeating frames, of which frames 22a, 22b, and 22c are exemplary. The frames are shown in linear form at 24. Each frame is subdivided into a plurality of slots, as shown with frame 24a. There are several types of slots in each frame. For instance, synchronization (sync) slots 26 are used to convey information needed to allow partitioned networks to merge as specified by time synchronization protocols. Ni bootstrap (NiB) slots 28 are used to transmit low rate common channel bootstrap data containing USAP information for allocating fixed reservation slots. NiB slots 28 are transmitted on a common channel and are received by all neighbors of a broadcasting node. Each NiB slot is pre-assigned and unique to every node in the network. A Ni Bootstrap Slot Position of node i (NSPi) corresponds to the unique slot within the Ni bootstrap cycle that node i has been assigned to transmit its Ni bootstrap. A Ni Bootstrap Slot Position of node j as known by node i (NSPj) is the NSP that node i knows about other nodes j. The correspondence between the NSPj and node IDs is loaded along with other configuration information, making the NSPj a more efficient means of addressing transmissions to specific neighbors without using full node IDs.

Each frame also includes one or more CNi Bootstrap (CNiB) slots 30, which is where the higher rate channel bootstrap is transmitted containing USAP information for assigning CNiB slots and RBSs. CNiB slots are received by neighbors of a node within the CNi. The CNi bootstrap slot is assigned dynamically and bears no relationship to the NSPi, which is assigned statically during configuration.

A Rotating Broadcast Slot (RBS) 32 is used for node activation. If reserved via the CNiB, RBS 32 provides contentionless access for a single node within UCNi. Outside of UCNi the RBS can be reused. The RBS also provides contention access if not reserved or if reserved and the owner indicates that it will not transmit in it in the near future, which will be discussed more fully herein with respect to slot headers. The RBS is also staggered from one frame to the next to minimize the impact on any one node when a Fixed Reservation Slot is assigned (which takes precedence over an RBS occurring in the same frame).

Fixed Reservation Slots (FRS) 32 are used for link or node activation. If reserved via the NiB it provides contentionless access for a single node within UNi. Outside of UNi it can be reused. The FRS is repeated in the same slot in each frame and replaces an RBS that may occur in the same frame. It is primarily intended for communications between ODMA channels but could also be assigned between nodes on the same DOCk.

As stated above, Rotating Broadcast Slots and Fixed Reservation Slots provide a means for contentionless access. For the purposes of this disclosure, contention or contention access occurs when more than a single node attempts to transmit in an unreserved slot or in a reserved slot that is not currently being used for transmission by its owner. If more than one node in a neighborhood actually transmits in a contended slot there is a chance that their transmissions may collide at the intended receiver(s), thereby preventing them from being received correctly. To reduce the chance of collision each of the contending transmitters may use a pseudorandom delay to determine whether it actually transmits in any given contention slot. The use of RBS and FRS provide another way to reduce the chance of message collision.

Figure 3:
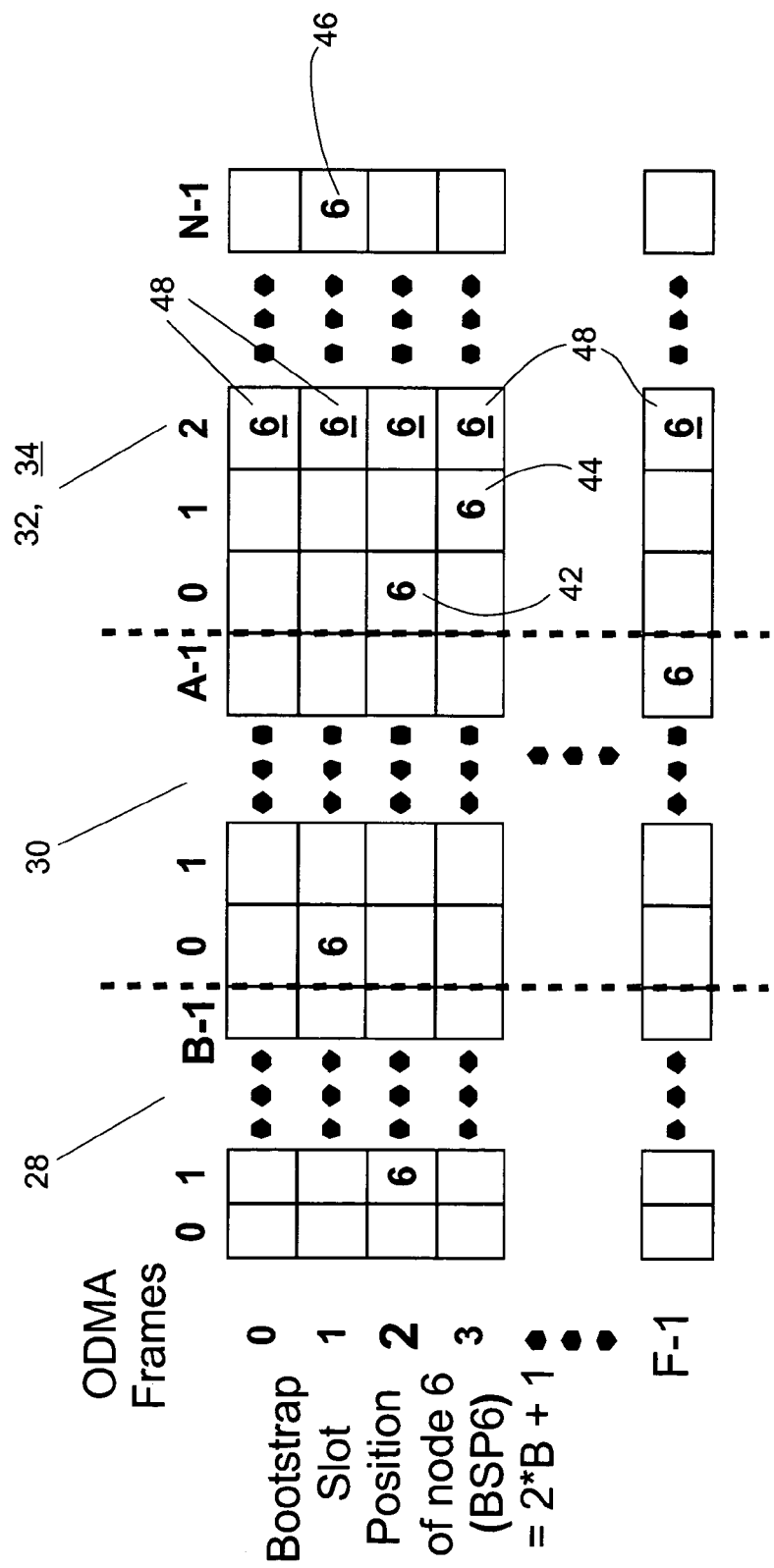
FIG. 3 is a chart showing slot assignments for multiple time frames on a single communications channel.

The different types of slots are shown in FIG. 3, which depicts slots in a single channel during consecutive frames. Node 6 uses NiB slot 1 during frame 2. Node 6 uses CNiB slot 0 during frame 1 and CNiB slot A-1 during frame F-1. Node 6 has also been assigned staggered Rotating Broadcast Slots 42, 44, 46. Node 6 further is using slot 2 during all frames to transmit using Fixed Reservation Slots 48. Note that the Fixed Reservation Slots take precedence over Rotating Broadcast Slots.

While the sync and bootstrap slots are on a common (pseudo-randomized) channel, such as channel 0 in FIG. 2, the rest of the slots occur in multiple channels of the ODMA frame. These are used for RBS and FRS on an ODMA channel to carry routine traffic between nodes on that channel. In addition, they can be assigned on other channels for enhanced communications between channels.

The sync slots are just large enough to accommodate the smallest amount of information needed to allow partitioned networks to merge. The number of these slots determines how quickly they can merge. The Ni and CNi bootstrap slots are just large enough to hold an Ni or CNi bootstrap packet, respectively. The remaining slots fill the rest of the frame. Their number factors into the broadcast cycle, the maximum number of nodes that can perform a rotating broadcast in a single frame, and their size determines the maximum amount of information in a single transmission. Their number and size combine to determine the frame latency.

The data typically transmitted during a bootstrap slot comprises a bootstrap packet. The two types of bootstrap packets, i.e., NiB and CNiB, are used for spreading different types of USAP information. For example, the NiB packet is transmitted in the preassigned Ni bootstrap slot. It is used for assigning reservations between nodes on different ODMA channels. It uses USAP information to reserve FRS slots. These slots repeat on the selected channel in every frame for increased bandwidth between nodes that may or may not have the same DOCk. Each NiB contains the following information:

- a node's ID. Neighbors of the node record the association of this node ID with the NiB slot.
- Whether the node is an advantaged node or not. A node that is advertising itself as advantaged would cause its non-advantaged neighbors to treat it as described further herein.
- Which DOCk and CNiB have been chosen by the node. This information helps nodes detect when they or their neighbors have unluckily chosen the same CNiB.
- An Ni nodality metric so that a node entering the network would aid in knowing how much randomization to use on NiB contention slots. This would allow the new node to establish itself quicker than waiting for an entire NiB cycle.
- USAP information to reserve FRSs. These slots repeat on the selected channel in every frame for increased bandwidth between nodes that may or may not have the same DOCk.

The CNiB packet is transmitted in the CNi bootstrap slot. It is used for assigning CNiB slots and RBSs between nodes on the same ODMA channel. It uses USAP information to assign CNiB slots. It also uses USAP information to assign RBSs, which repeat on the selected channel according to the staggered RBS schedule for increased bandwidth between nodes that have the same DOCk. Each CNiB may contain the following information:

- a node's ID.
- A CNi nodality metric so that a node entering the network would aid in knowing how much randomization to use on CNiB and RBS contention slots. This would allow the new node to establish itself quicker than waiting for an entire CNiB cycle.
- USAP information to reserve CNiB slots. These slots repeat every CNiB cycle. A node that wishes to reserve a RBS slot can reserve a CNiB slot so that USAP can advertise the constraints consistently.
- USAP information to reserve RBS slots. These slots repeat every frame except that they are shifted by one slot until they arrive at their original position every RBS cycle.

The NiB is transmitted on a common channel so that it can be heard by all neighbors of i. It contains USAP information for reserving FRSs. The CNiB is transmitted concurrently by all nodes using the same slot on their assigned DOCks. Thus it is intended only for neighbors of node i on the same DOCk and contains USAP information for assigning CNiB slots and RBSs.

Each type of bootstrap has its own cycle. The NiB cycle is relatively long so that it is most suitable for long-lived, stable reservations. This is intended for maintaining unicast communications between DOCks. The CNiB cycle on the other hand is as short as possible to minimize latency in response to surges of bursty traffic within a DOCk. The shorter cycle is possible because the nodes of one DOCk are transmitting the CNiBs concurrently with the nodes of other DOCks.

Because the NiB cycle is relatively long, it is useful to have some additional NiB slots that are used on a contention basis. NiBs are the vehicle for assigning FRSs between DOCks and are used on relatively stable, long-lived links. To decrease the latency in initially assigning the slots, the contention slots are used. In other words, if the scheduled NiB slot is not close in time, the assignment is first announced in a NiB contention slot to get it established and after that just in the NiB scheduled slot for maintenance.

Because the CNiB slots are assigned dynamically, a large pool of them should be available for stability. This allows a denser neighborhood, especially when 3-hop reuse is in effect, as further described herein. Also, additional slots allow contention access to reduce the latency of nodes trying to set up reservations for longer term sessions. The number of CNiB slots should also be great enough to allow each DOCk member to assign itself a slot for the case of uniform traffic. This allows for a graceful degradation of service without excluding nodes from the network.

The dynamic assignment of CNiB slots also opens the possibility of conflicting assignments. This is the reason that the CNiB of a node is listed in its NiB. If the conflicting assignments are for direct neighbors then the direct neighbors should recognize the conflict by hearing each other's NiBs announcing the same CNiB on the same DOCk. A conflict will also be declared if there is an intervening neighbor that, recognizing that both of these nodes are reporting the same CNiB slots in their NiBs. In this case the CNiB is being reused after only 2 hops and a conflict will be declared.

To join a neighborhood, a node advertises its DOCk in the NiB. As part of the neighborhood, the node does one or more of the following:

The node assigns a CNi bootstrap slot and RBS(s) as required by its traffic needs.

The node increases its transmission capacity in the DOCk by reserving RBSs. It can also add a link to another DOCk with an FRS via the NiB.

A node with an assigned RBS transmits monitor packets, which contain lists of neighbors and other information to be shared with neighbors on the same DOCk, and traffic to its neighbors on the same DOCk.

Without an assigned RBS the monitor packets and traffic are transmitted much less frequently using loaned RBSs or contention on unused or yielded RBSs.

Once a node starts transmitting, its neighbors measure its received link qualities. They in turn feed back the received link metrics back to the transmitters using the monitor packets. These are then used to adapt transmission parameters.

A transmission fits within the boundaries of the type of slot for which it is intended. The transmission is built up of cells whose size is fixed and determined by the communications plan. The format of a transmission includes a slot header, which contains the following information:

Identification of the transmitting node.

A bit indicating whether this slot is assigned for RBS transmission by this node.

A number indicating the transmit needs of this node. The higher the transmit needs the more likely it is that a neighbor with an assigned but unused RBS slot will loan it to this node.

A bit map indicating which of the transmitting node's upcoming RBS slots will be used. Allocated but unused RBS slots can be loaned to a specific neighbor or yielded for contention.

The NSP of a neighbor node to which this node is loaning the unused RBS slots. If this node is not loaning its unused RBS slots, then the unused RBS slots are yielded for contention.

Number of entries in the Cell header array.

A Cyclic Redundancy Check (CRC) covering previous fields

The maximum number of cells that will fit in each transmission type is dependent on the data rate in effect for the intended slot. If while building a transmission of a certain type, there are not enough cells available for the primary use of the slot, cells of other types can be inserted to fill the transmission as long as the intended receiver(s) of the transmission match the intended receiver(s) of the cells. In particular, if a slot has been reserved and cells with the corresponding reservation ID have been exhausted, cells with no reservation ID can be inserted.

USAP

Reference has been made herein to the Unifying Slot Assignment Protocol (USAP). Briefly, USAP dynamically assigns TDMA (or ODMA) slots using information shared in bootstrap packets. The network uses USAP to allocate unicast and broadcast slots to support point-to-point and point-to-multipoint communications between neighboring nodes.

Figure 5:
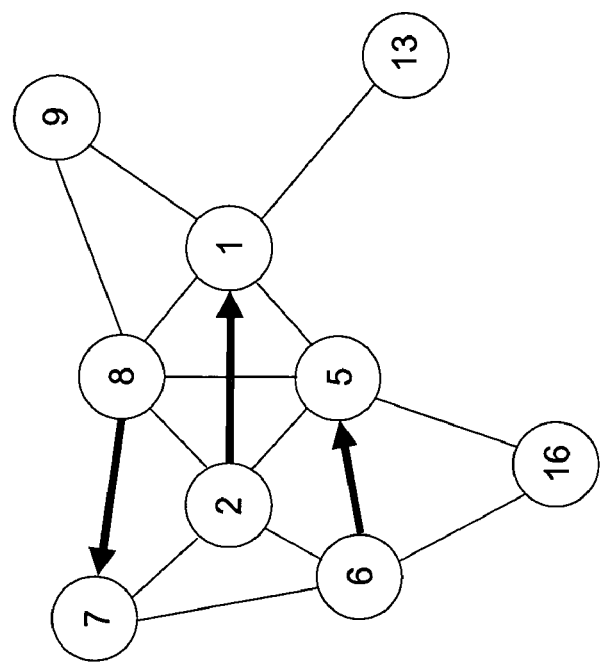
FIG. 5 is a schematic diagram of another communications network.
Figure 4:
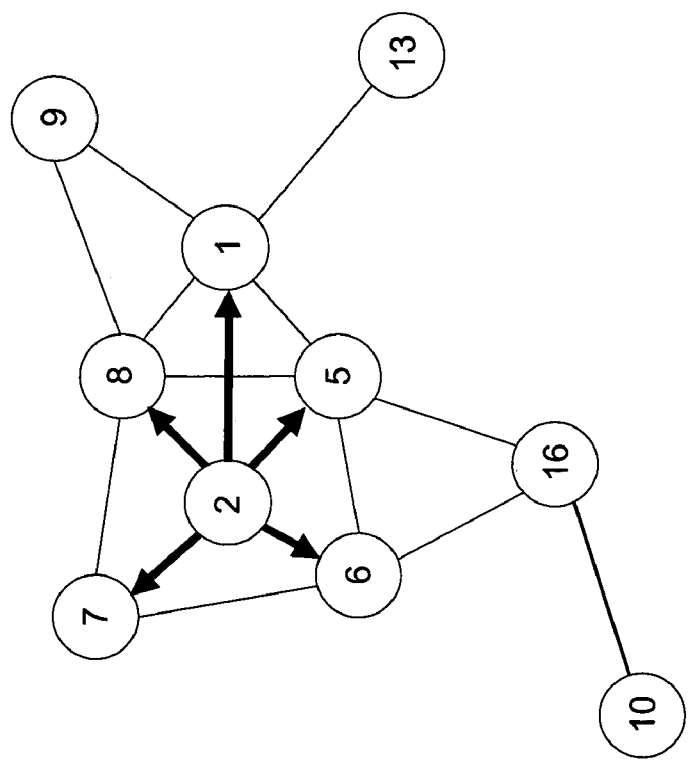
FIG. 4 is a schematic diagram of a communications network.

Traditionally, there are two methods in which a node transmits to its neighbors. The first, known as "node activation" or "broadcast", is shown in FIG. 4. Node activation has a transmitter, such as node 2, broadcast to all of its neighbors at once rather than individually. The second method, known as "link activation" or "unicast" and shown in FIG. 5, occurs when a transmitter such as node 2 intends to have only one receiver, such as node 1. Node activation allows only one active transmitter in a neighborhood, while link activation can potentially have several transmitters at a time in the same neighborhood.

USAP provides support for both broadcast and unicast. The broadcast assignment is used for Rotating Broadcast Slots. The unicast assignment is used for Fixed Reservation Slots to reserve capacity between two nodes on the same or different ODMA channels.

When a node chooses an allocation, USAP enforces constraints to avoid interference within 2 hops of the transmitting node. As used herein, "allocation" refers to an ordered pair of Radio Frequency (RF) channel and time slot. A node ensures that its allocations satisfy the USAP constraints by sharing the following slot sets with its neighbors:

STi—allocations where a node is transmitting
SRi—allocations where a node is receiving
NTi—allocations where a node's neighbors are transmitting These slot sets are transmitted in the bootstrap packets. This information, exchanged between neighboring nodes, is used by the USAP such that nodes may choose non-conflicting transmit allocations consistent with the most recent topology measurements and detect and report conflicts caused by topology changes.

The USAP information is exchanged in the two different kinds of bootstraps, namely, the CNi bootstrap (CNiB) and the Ni bootstrap (NiB). Although exact format of each of these is a function of the communications plan, the bootstrap nodes contain certain information as described herein. Furthermore, for an FRS, every member of the STi or SRi set has a corresponding receiving id field to indicate the intended receiver. The receiving id will include bits to indicate which channel will be used. This should always be the receiver's DOCk except if the receiver has just moved to a different DOCk, in which case USAP will keep the FRSs on the original DOCk until they are released or a conflict is detected. To have enough USAP information to maintain the FRSs on the original DOCk, the receiver id and channel information shall be included in both the transmitter's and receiver's NiB.

To choose an FRS slot, a node first generates the set of slots that are not available because they are already in use locally. In the description that follows, the subscript of "i" denotes information about this node and "j" denotes the corresponding information reported by a neighboring node.

Slot Assignments:
  S=set of slots
  F=set of channels

Self Transmit/Receive Sets:
  $STN_i(s,f)$=set of neighbors to which node i transmits on (s,f)
  $SRN_i(s,f)$=set of neighbors from which node i receives on (s,f) from which the following sets are derived:
  $ST_i(s,f)$=set of allocations for which $STN_i(s,f)$ is not empty
  $SR_i(s,f)$=set of allocations for which $SRN_i(s,f)$ is not empty Neighbor Transmit/Receive Sets:
  $ST_j(s,f)$=the $ST_i(s,f)$ reported by neighbor j
  $SR_j(s,f)$=the $SR_i(s,f)$ reported by neighbor j from which the following sets are derived:
  $NT_i(s,f)=\cup ST_j(s,f)$ over all neighbors j of node i
  $NR_i(s,f)=\cup SR_j(s,f)$ over all neighbors j of node i
  $NT_j(s,f)$=the $NT_i(s,f)$ reported by neighbor j A node i or its neighbor j transmitting or receiving (on any channel) in slot s, is blocked from using slot s on any other ODMA channel. To this end the following derived sets are useful:

$Bi(s)=STi(s,f) \cup SRi(s,f)$ for any f
$Bj(s)=STj(s,f) \cup SRj(s,f)$ for any f
$CoNRi(s)=\cup SRj(s,f)$ for any f over all Co-sited neighbors j of node i To decide what slots and channels are available for FRS unicast allocation, a node i constructs the blocked allocations for transmitting to j by excluding allocations

| whose slot is already assigned to either node: | $Bi(s) \cup Bj(s)$ |
| i's co-sited neighbors are receiving in: | $CoNRi(s)$ |
| i's neighbors are receiving in: | $NRi(s,f)$ |
| j's neighbors are transmitting in: | $NTj(s,f)$ |

This information is combined as follows:

$Blocked(i,j,s,f)=Bi(s) \cup Bj(s) \cup CoNRi(s) \cup NRi(s,f) \cup NTj(s,f)$=set of allocations where i cannot transmit to j To decide what slots are available for FRS broadcast allocation on a particular channel f, a node i could construct the blocked allocations for transmitting to its neighbors on f by excluding allocations

| whose slot is already assigned to i: | $Bi(s)$ |
| whose slot is already assigned to any of its neighbors on f: | $\cup_{\forall n \in (i's\_nbrs)} Bj(s)$ |
| i's co-sited neighbors on any channel are receiving in: | $CoNRi(s)$ |
| any of i's neighbors' neighbors on f are transmitting in: | $\cup_{\forall n \in (i's\_nbrs)} NTj(s,f)$ |

This information is combined as follows:

$Blocked(i,s,f)$   $Bi(s) \cup_{\forall n\{i's\_nbrs\}} Bj(s) \cup CoNRi(s)$
$\cup_{\forall n\in\{i's\_nbrs\}} NTj(s,f)$=set of allocations where i cannot transmit to its neighbors on f CNIB and RBS slots are allocated with 3-hop constraints if possible. This is illustrated in FIG. 4, in which node 9 would be permitted to use the same channel as node 10 because the nodes are more than three hops apart from each other.

To decide what slots are available for CNIB or RBS broadcast allocation on a particular channel f, a node i constructs the blocked allocations for transmitting to its neighbors on f.

To enforce 3-hop reuse a new set is defined:

$NNTi(s)=\cup SRj(s,f)$ over all neighbors j of node i on channel f, but only if (s,f) is not also a member of SRi(s,f) or the transmitter in (s,f) is not a neighbor of j. This latter clause prevents two neighbors of a transmitter from reporting an NNTi as a result of hearing each other's SRi, thereby causing the transmitter to falsely detect a 3-hop conflict.

by excluding allocations whose slot is already assigned to i or any of its neighbors: $\cup_{\forall n \in\{i's\_nbrs\}} Bj(s)$ i's neighbors neighbors are transmitting in: $\cup_{\forall n \in\{i's\_nbrs\}} NNTj(s)$ This information is combined to identify allocations where i cannot transmit:

$Blocked(i,s)=\cup_{\forall n \in\{i's\_nbrs\}} Bj(s) \cup_{\forall n\in\{i's\_nbrs\}} NNTj(s)$ If all slots are blocked under 3-hop constraints the information can be combined to give 2-hop reuse:

$Blocked(i,s)=\cup_{\forall n\in\{i's\_nbrs\}} Bj(s)$

On-Demand Broadcast Protocol (ODBP)

The USAP algorithm disclosed above permits efficient use of broadcast resources by permitting the simultaneous use of broadcast slots by nodes that are three or more hops apart. USAP concepts may be applied to situations in which some nodes in a network are allocated, assigned, or otherwise have access to more communication slots than do other nodes in the network. In such a situation, further communication efficiencies may be realized by transferring, either temporarily or permanently, the use of unused communication slots to nearby nodes.

A node temporarily gives up the use of future allocated RBS slots when it does not have traffic to transmit. In its simplest form the node "yields" the slots for contention access by its neighbors. A node could "loan" the slots to a particular neighbor but this requires that the RBS slots satisfy 3-hop constraints like those of CNiB slots as described above. A node that owns a 3-hop constrained RBS slot is able to loan it to a neighbor so that the neighbor can transmit in the slot without violating the 2-hop USAP constraints.

As previously discussed, the slot header includes a number to indicate how much traffic a node has to send (its transmit needs). A neighboring node that has an assigned RBS slot and has little traffic of its own could loan the slot to a neighbor with a high load. The slot header also includes a bit map indicating which reserved RBS slots will be used in the upcoming frame(s) and a field to specify the NSP of the neighbor that the slot is loaned to. If the NSP is NULL then the slots are yielded rather than loaned.

An RBS owner can continue to loan upcoming unused slots for as long as a neighbor indicates a need. If more than one neighbor indicates a high load then the owner of the RBS slot is the arbiter for loaning the slot, thereby eliminating contention for that slot.

By using the mechanisms just described, a node in a network yields unused RBS slots or loans the slots to a particular neighbor. A node that has yielded or loaned an upcoming RBS slot does not transmit in the slot. This includes the case that traffic for transmission has arrived prior to the slot.

Figure 6:
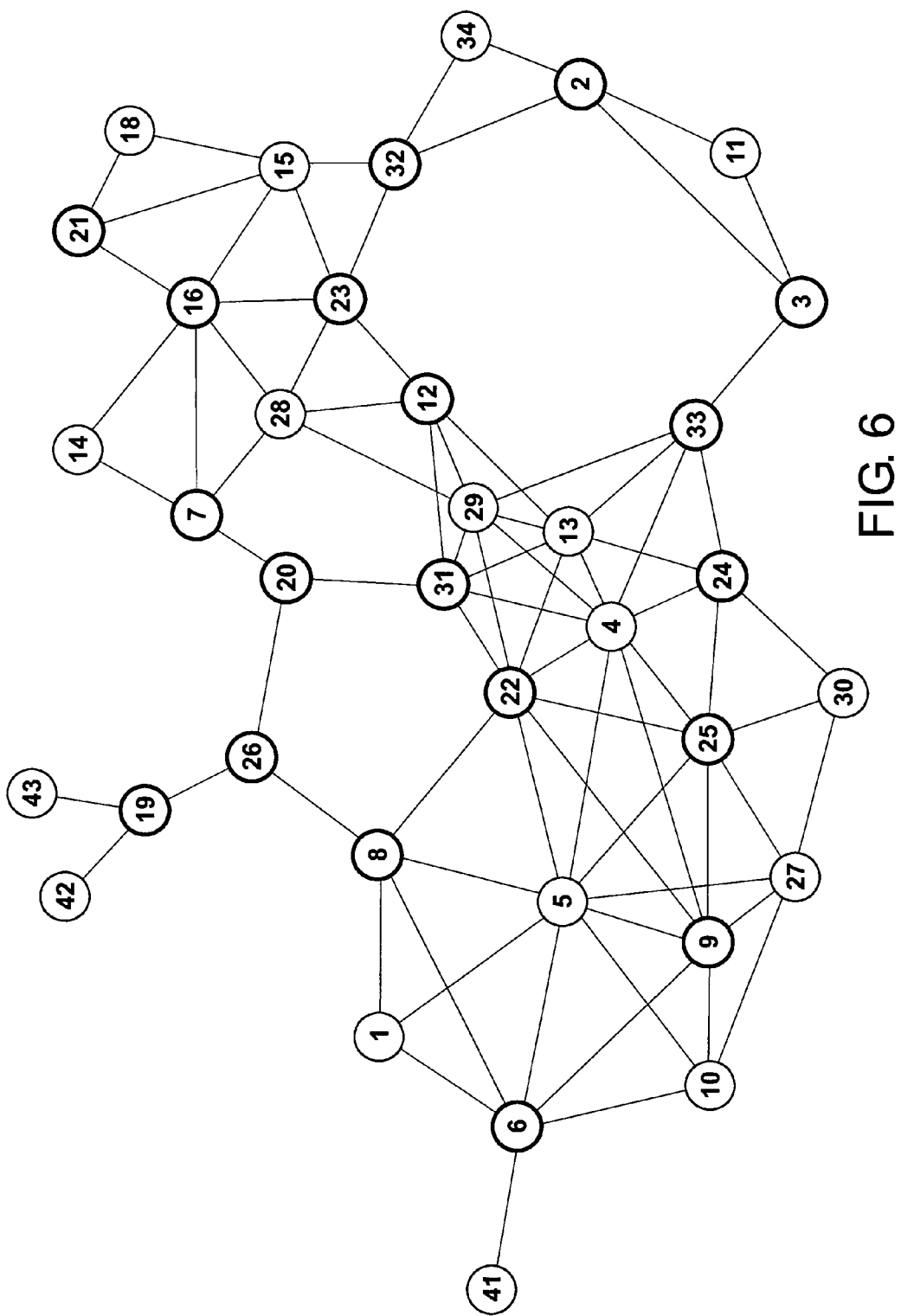
FIG. 6 is a schematic diagram of a communications network having resource-rich and resource-poor nodes.

An example of the invention in operation will now be described. FIG. 6 depicts a network of nodes in which some of the nodes, termed herein resource-rich nodes, are assigned more communications slots than may be needed by those nodes. Resource-rich nodes, such as nodes 2, 3, and 6-9, are shown with bold outlines. Other nodes, which are assigned fewer communications slots than the resource-rich nodes, will be termed herein as resource-poor or needy nodes and are shown with lighter outlines, such as nodes 1, 4, 5, 10, and 11. Resource-poor nodes may also be considered to be nodes not having enough communication slots to timely transmit required messages. A resource-rich node such as node 6 communicates with its neighbors (nodes 1, 5, 8, 9, 10 and 41) in a slot header file and informs its neighbors which slots node 6 intends to use in an upcoming frame. Each neighbor of node 6, such as resource-rich nodes 8 and 9 and resource-poor nodes 1, 5, 10 and 41, communicates to its respective neighbors (including, in each case, node 6) its transmit needs through the use of a numerical priority indicator in a slot header. The value of the priority indicator may be affected by one or more of the following circumstances: the neighbor node is attempting to transmit a relatively large file or amount of information and requires a substantial number of slots to do so; the neighbor node is transmitting a time-critical file; the neighbor node has not been successful in a predetermined number of previous attempts to obtain slots from node 6 or from other neighboring resource-rich nodes; the resource-rich node is the only neighbor of the neighbor node; the neighbor node is itself a resource-rich node; or, the neighbor node is associated with a user having self-evident or predefined priority over other users, which in a military network may be a high-ranking official or military intelligence user, or a distress signal from an aircraft or a downed pilot, and in a commercial network may be a user paying a premium for priority service.

Once resource-rich node 6 has received responses from its neighboring nodes, node 6 determines whether the slot satisfies a three-hop constraint with respect to node 6. In other words, node 6 determines whether any node within three hops of node 6 is already scheduled to use the slot. According to the invention, node 6 will permit one of its neighbors (i.e., nodes within one hop of node 6) to use the slot only if no nodes within three hops of node 6 are scheduled to use the slot. If the slot satisfies this three-hop constraint, node 6 then determines which neighboring node is to use the slot. If for example only node 41 requests use of the slot, node 6 permits node 41 to use the slot. If more than one node requests use of the slot, node 6 is the arbiter of use of the slot among those neighboring slots with a need to use the slot.

A resource-rich node such as node 6 may permit a neighboring node to use an unused slot in more than a single frame. If the needs of the neighboring node are sufficiently high, as evidenced by a high numerical value of the priority indicator or by the lack of other neighbors requesting use of the slot, the resource-rich node may grant or loan to the neighboring node the slot over multiple time frames or as long as the neighboring node requires expanded communication resources. For example, the resource-rich node may loan a slot to a neighboring resource-poor node until a file has been completely transmitted, or until the numerical value of the priority indicator is no longer above a predetermined level.

Another way to determine which node is to use a slot is for the resource-rich node, such as node 6 in FIG. 6, to permit the competing neighboring nodes to compete or contend for use of the slot. Each neighbor of resource-rich node 6, prior to contending for use of the slot, preferably consults the information obtained through USAP techniques to determine whether the neighbor would violate two-hop constraints if the neighbor were to win the contention for the slot. For example, prior to competing for a slot yielded for contention by node 6, node 10 would check its USAP information to see whether any nodes within two hops of node 10 have already been scheduled or assigned the slot. If node 30 (which is two hops away from node 10) is already scheduled to use the slot, node 10 would not contend for use of the slot. However, if no nodes within two hops of node 10 are scheduled or assigned the slot, node 10 would then contend for use of the slot with other neighboring nodes of node 6 that are similarly free from conflicts. Such contention among nodes for use of the slot preferably would be resolved through the use of randomization techniques. In a preferred embodiment, each node contending for use of the slot is required to wait a random amount of time before using the slot. Because the resource-rich node has received communications from all its neighbors, the resource-rich node is aware of how many of the neighboring nodes are resource-poor and will contend for the slot. The length of the randomization interval is increased as the number of resource-poor nodes contending for the slot increases. Conversely, the length of the randomization interval is decreased as the number of resource-poor nodes contending for the slot decreases so that latency is reduced. Once the length of the randomization interval is determined, the resource-rich node announces said length to its neighboring nodes so that the neighboring nodes can contend for the slot.

The resource-rich nodes and the resource-poor nodes may be permanently predefined as such, or the network may include nodes that switch between being resource-rich nodes and resource-poor nodes, and vice versa. Indeed, the invention is applicable in any type of communications network where a node has, either temporarily or permanently, access to more communication slots than one or more of its neighboring nodes. The invention is further applicable in any type of communications network where any node has, either permanently or temporarily, not enough communication slots to timely transmit information through the network, and a neighbor of that node has more slots than needed to timely transmit information through the network.

If node 6 is part of an ad-hoc network employing USAP protocols as described above, the invention adds an additional hop to the USAP two-hop constraint so that simultaneous use of a communication slot is permitted by nodes more than three hops apart. This is done so that a resource-rich node can yield or loan the slot to its neighbors without violating the normal USAP two-hop rule.

Figure 7:
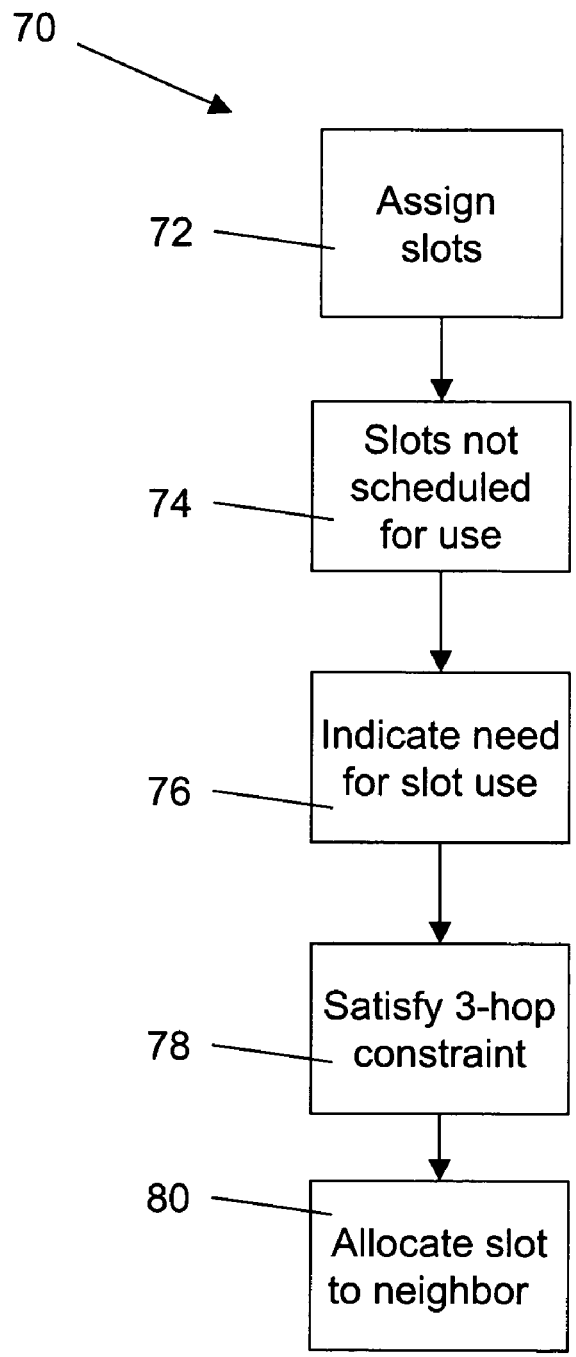
FIG. 7 is a flowchart showing a method according to an aspect of the invention.

FIG. 7 is a flowchart showing a method 70 according to an embodiment of the invention. In step 72, communication slots are assigned to various nodes in the network. In step 74 resource-rich nodes having communication slots assigned thereto communicate, to neighboring nodes, which communication slots will be used by the respective resource-rich node. In step 76 nodes within one hop of a resource-rich node communicate their respective transmit needs. In step 78 the resource-rich node determines whether a slot, assigned to it but not scheduled to be used by it, is scheduled to be used by any other node in the network less than four hops from the resource-rich nodes. If not, in step 80 the resource-rich node permits one of its neighboring nodes (i.e., nodes within one hop of the resource-rich node) to use the slot.

The invention as described above provides for the reallocation of assigned slots if the node to which the slot has been assigned is not scheduled to use the slot. In another aspect of the invention, resource-poor nodes may compete for unassigned slots so long as the two-hop USAP constraints are not violated. For example, in the network shown in FIG. 6, node 10 receives communications from neighboring nodes 5, 6, 9 and 27 as to which slots those nodes will be using in a subsequent frame. Using USAP algorithms, each of neighboring nodes 5, 6, 9 and 27 also communicates which slots its neighbors are assigned in the subsequent frame. Node 27, for example, will communicate the slot use for nodes 9, 10, 5, 25 and 30. From the communications node 10 receives from its neighbors, node 10 determines which slots in the subsequent frame are unassigned to nodes within two hops of node 10. Each resource-rich and resource-poor node in the network similarly determines which slots in the subsequent frame are unassigned to nodes within two hops of the respective node. Those nodes that require use of an unused slot can then contend for its use. For example, if nodes 10 and 25 require the use of a particular unused slot, those two nodes must contend for use of the slot, preferably by using randomization techniques, which node should use the slot.

Figure 8:
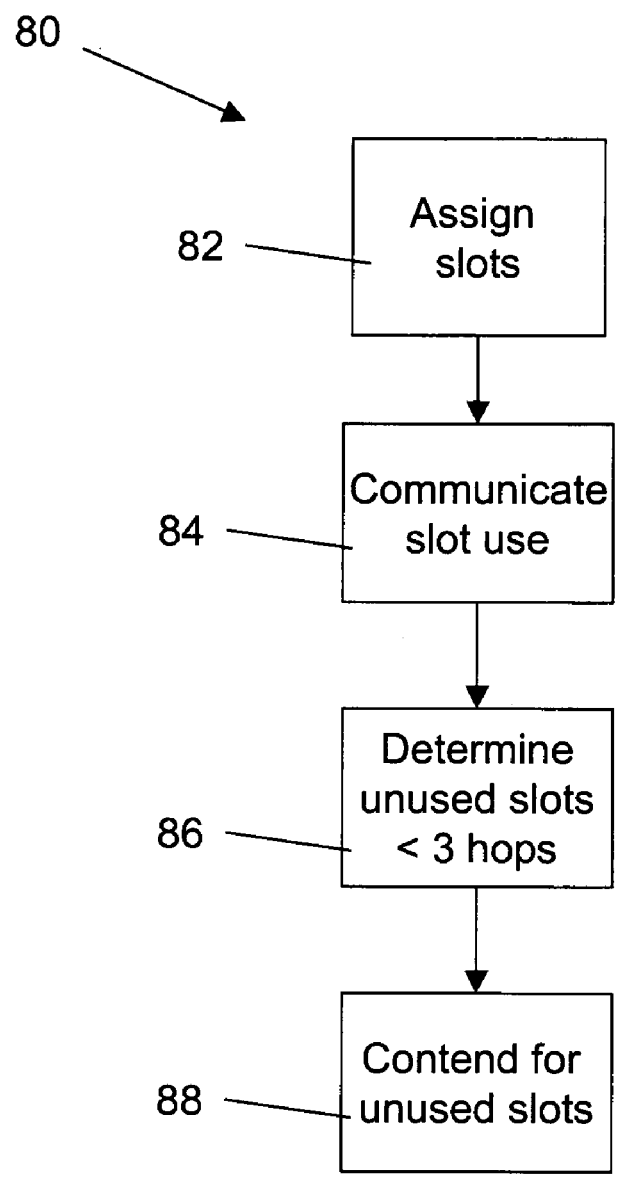
FIG. 8 is a flowchart showing a method according to another aspect of the invention.

FIG. 8 is a flowchart of another method 80 according to another aspect of the invention in which needy or resource-poor nodes contend for unallocated slots. In step 82 slots are assigned to various nodes in the network. In step 84 nodes receive transmissions from their one-hop neighbors that communicate which slots the neighbors are scheduled to use. From this information, in step 86 each node determines which slots, if any, are not scheduled to be used by any node within two hops of the node. In step 88, nodes not conflicted by step 86 contend for use of the slot as previously described herein.

The invention as described herein provides an effective method of allocating time slots to the nodes in a network that need to use the slots. An advantage of the invention is that surplus or unused time slots are efficiently allocated to needy nodes.

Another advantage is that the re-allocation or re-assignment of time slots is done in a manner consistent with other ad-hoc techniques such as USAP. The result of the invention is that the slot re-allocation maintains the conflict-free slot use environment of USAP.

Still another advantage is that the re-allocation is performed at the node level and not at the network level. In other words, no network-wide algorithm is required for re-allocation. The re-allocation is performed locally and only requires nodes to communicate information about their neighbors and their neighbors' neighbors. In networks such as USAP-enabled networks, this type of information is already communicated, and the use of pre-existing communications regimes is yet another advantage of the invention.

Yet another advantage of the invention is that unused slots can be awarded to needy or resource-poor nodes using a variety of methods, such as one-time loaning, extended loaning, or yielding for contention.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of communicating over a network of nodes using a plurality of time slots, wherein nodes are permitted to simultaneously use a time slot only when the nodes are at least three hops apart, the method comprising:

assigning at least one of the plurality of time slots to a first node;

the first node communicating, to neighboring nodes within one hop of the first node, which time slots assigned to the first node are scheduled to be used by the first node;

each neighboring node determining whether said each neighboring node has a need to use more time slots than have been assigned to said each neighboring node;

each neighboring node communicating its respective need to the first node; and permitting at least one of the neighboring nodes to use a time slot assigned to the first node and not scheduled to be used by the first node;

wherein the permitting step further includes permitting at least one of the neighboring nodes to use the time slot assigned to the first node, and not scheduled to be used by the first node, only when said at least one of the neighboring nodes has not indicated a preference to obtain slots from a node other than the first node.

2. The method of claim 1, wherein the step of each neighboring node communicating its respective need includes transmitting, to nodes within one hop of each said neighboring node, a need indicator expressing relative broadcast need of the neighboring node, and wherein the first node permits at least one of the neighboring nodes, having a need indicator higher than a predetermined level, to use the time slot assigned to the first node and not scheduled to be used by the first node.

3. The method of claim 2, wherein the need indicator for a neighboring node is increased when said neighboring node has a predefined broadcasting priority relative to other nodes in the network.

4. The method of claim 2, wherein the need indicator for a neighboring node is increased when said neighboring node has a time-critical message to transmit.

5. The method of claim 2, wherein the first node determines which neighboring node is to use the time slot by comparing need indicators associated with each neighboring node.

6. The method of claim 1, wherein the first node yields up the time slot for contention among conflict-free neighboring nodes which have no nodes within two hops that are scheduled to use the time slot, and further wherein each of the conflict-free neighboring nodes waits a random amount of time before being permitted to use the time slot.

7. The method of claim 6, wherein the random amount of time is selected from a randomization interval, and further wherein the randomization interval increases as a number of conflict-free neighboring nodes increases.

8. The method of claim 1, wherein the permitting step includes permitting at least one of the neighboring nodes to use the time slot in successive time frames.

9. The method of claim 8, wherein the permitting step includes permitting at least one of the neighboring nodes to use the time slot in successive time frames until no longer needed by the said at least one of the neighboring nodes.

10. The method of claim 1, further comprising:

each neighboring node determining whether no node within two hops of said each neighboring node is scheduled to use said time slot;

wherein the one of the neighboring nodes permitted to use said time slot is at least three hops from any other node in the network scheduled to use the time slot.

11. A method of managing communication resources in a network of nodes, wherein a first node has a communication time slot allocated thereto, the method comprising:

the first node communicating, to a neighboring node within one hop of the first node, whether the first node intends to use the communication time slot;

the neighboring node indicating, to nodes within one hop of said neighboring node, whether the neighboring node needs to use more communication time slots than have been allocated to said neighboring node; and the first node permitting the neighboring node to use the communication time slot when the first node is not scheduled to use the communication time slot;

wherein the permitting step further includes permitting the neighboring node to use the time slot assigned to the first node, and not scheduled to be used by the first node, only when the neighboring node has not indicated a preference to obtain slots from a node other than the first node.

12. The method of claim 11, wherein the permitting step further includes permitting the neighboring node to use the communication time slot when the first node is not scheduled to use the communication time slot and when the communication time slot is not scheduled to be used by any node within two hops of the neighboring node.

13. The method of claim 11, wherein the neighboring node is a first neighboring node, and further including a second neighboring node within one hop of the first node, and further wherein the indicating step includes:

each of the first and second neighboring nodes transmitting a numeric value expressing a relative need of said each of the first and second neighboring nodes to use the communication time slot;

wherein the first node permits one of the first and second neighboring nodes having a numeric value with a value higher than a predetermined level, to use the communication time slot when the first node is not scheduled to use the communication time slot.

14. The method of claim 13, wherein the numeric value associated with the first neighboring node is increased when the first neighboring node has a predefined broadcasting priority relative to other nodes in the network.

15. The method of claim 13, wherein the numeric value associated with the first neighboring node is increased when the first neighboring node has a message to transmit having a relative size greater than messages other nodes in the network are transmitting.

16. The method of claim 11, wherein the neighboring node is one of a plurality of neighboring nodes, and wherein the first node yields up the communication time slot for contention among conflict-free neighboring nodes which have no nodes within two hops that are scheduled to use the communication time slot and which have a need to use the communication time slot, and further wherein each of the conflict-free neighboring nodes waits a random amount of time before being permitted to use the communication time slot.

* * * * *